United States Patent
Kernick et al.

[15] 3,648,150
[45] Mar. 7, 1972

[54] APPARATUS FOR PRODUCING A LOW-DISTORTION PULSE WIDTH MODULATED INVERTER OUTPUT

[72] Inventors: Andress Kernick; Manvel A. Geyer, both of Lima; Glenn W. Ernsberger, Worthington, all of Ohio

[73] Assignee: Westinghouse Electric Corporation, Pittsburgh, Pa.

[22] Filed: Feb. 26, 1970

[21] Appl. No.: 14,314

[52] U.S. Cl. ............................321/9 A, 321/45 R, 332/38, 332/43 B, 336/69
[51] Int. Cl. ..................H02m 1/12, H02m 7/52, H03c 1/00
[58] Field of Search .................321/5, 9 R, 9 A, 16, 18, 45 R; 332/43 B, 38; 336/69, 181; 330/10

[56] References Cited

UNITED STATES PATENTS

| 3,310,730 | 3/1967 | Ruch | 321/45 X |
| 3,317,816 | 5/1967 | Wilting | 321/45 |
| 3,341,766 | 9/1967 | Rhyne | 321/45 X |
| 3,409,817 | 11/1968 | Gillett | 321/9 A |
| 1,732,937 | 10/1929 | Jones | 336/181 |
| 2,436,129 | 2/1948 | Weathers | 336/181 |
| 3,305,796 | 2/1967 | Somer et al. | 332/43 B |
| 3,315,181 | 4/1967 | Rosenthal | 332/43 B |
| 3,430,151 | 2/1969 | Badessa | 332/43 B |
| 3,504,265 | 3/1970 | Toulemonde | 321/9 X |
| 3,509,445 | 4/1970 | Chirgwin et al. | 321/9 A |

FOREIGN PATENTS OR APPLICATIONS

| 1,048,682 | 11/1966 | Great Britain | 321/9 A |

Primary Examiner—William H. Beha, Jr.
Attorney—F. H. Henson, M. P. Lynch and C. F. Renz

[57] ABSTRACT

The invention comprises apparatus for comparing the filtered output of a pulse width modulated inverter circuit with an AC reference voltage waveform and generating output voltage signals to control the inverter drive circuit to the extent necessary to produce an inverter output waveform substantially duplicating the reference voltage waveform and substantially void of low-order harmonics.

11 Claims, 5 Drawing Figures

Patented March 7, 1972
3,648,150
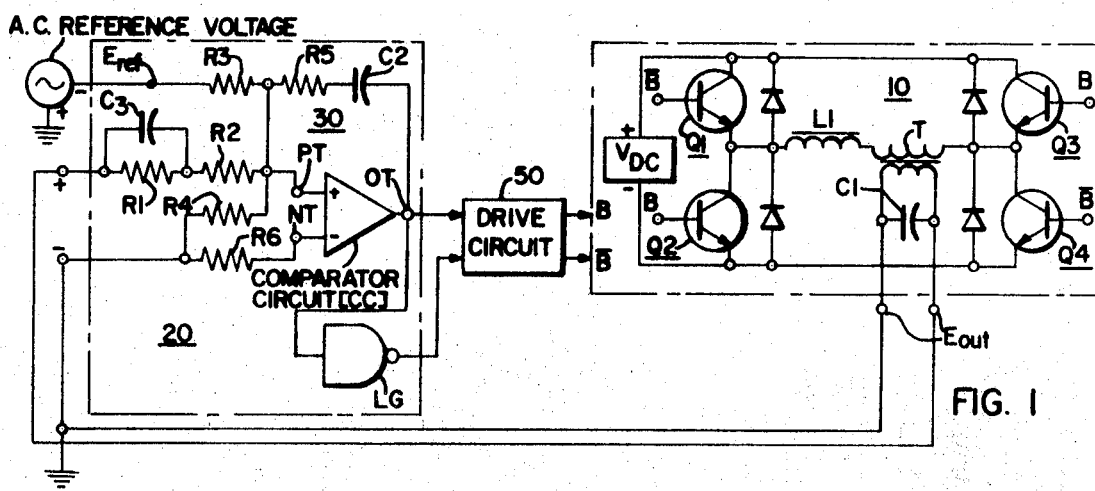
FIG. 1
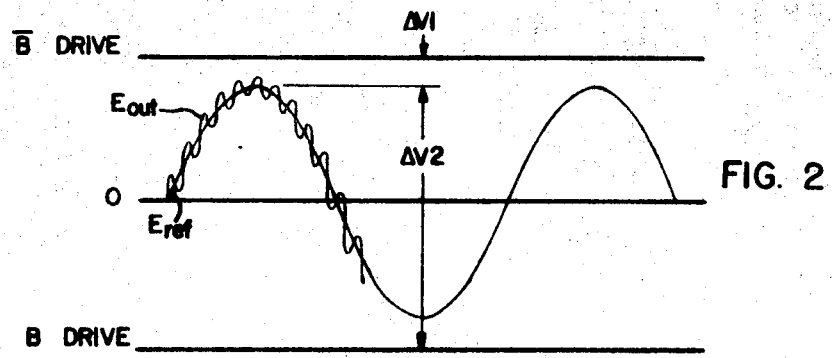
FIG. 2
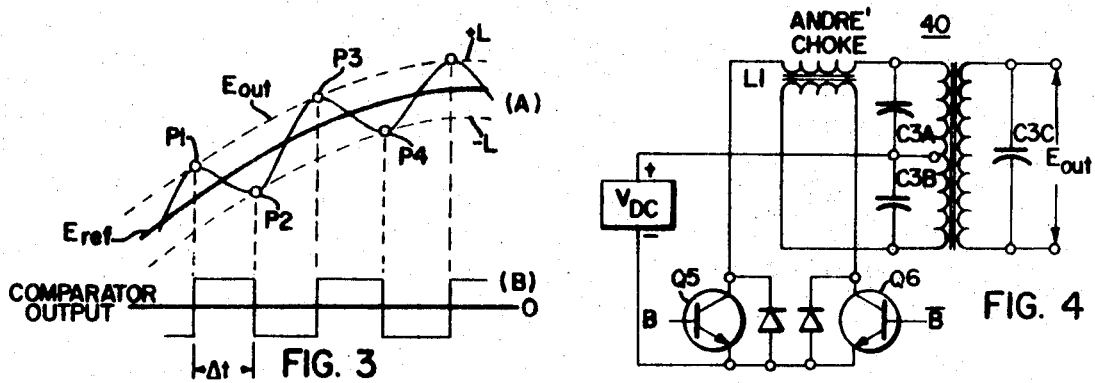
FIG. 3
FIG. 4
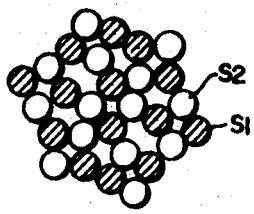
FIG. 5
WITNESSES
Alfred G. Colaizzi
James F. Young
INVENTORS
Manvel A. Geyer
Glenn W. Ernsberger
Andress Kernick
Michael P. Lynch
ATTORNEY

APPARATUS FOR PRODUCING A LOW-DISTORTION PULSE WIDTH MODULATED INVERTER OUTPUT

BACKGROUND OF THE INVENTION

The availability of improved semiconductor switching devices, such as, power transistors, gate controlled switches, thyristors, etc., has resulted in numerous efforts to reduce the size and weight of inverter output filter circuits by utilizing complex high-frequency switching techniques. Examples of these inverter switching techniques include the staggered-phase-carrier-cancellation inverter (SPCC), phase-demodulated high-frequency inverter, programmed waveform inverter, pulse width modulated inverter, and high-frequency step wave inverter.

SUMMARY OF THE INVENTION

The invention comprises apparatus for controlling the gating of inverter power switches as a function of the comparative values and polarities of the inverter output voltage and an AC reference voltage so as to establish an inverter output waveform that approximates the reference waveform.

The inverter output voltage, the AC reference voltage and a feedback signal from a comparator circuit are supplied as input signals to the comparator circuit which, depending on the relative magnitude of the input signals, generates either a positive or negative polarity output pulse when the difference between the relative magnitudes indicates a net positive or negative error voltage.

The comparator output pulse functions to gate the inverter power switches in a systematic manner to limit the difference between the inverter output voltage and the AC reference voltage. With the AC reference voltage held constant, control of the conduction of the inverter power switches by the comparator output pulses will result in an inverter output voltage waveform which approximates the AC reference voltage waveform.

The invention will become more readily apparent from the following exemplary description in connection with the accompanying drawing.

DESCRIPTION OF THE DRAWING

FIG. 1 is a schematic illustration of the preferred embodiment;

FIGS. 2 and 3 are representations of wave shapes illustrating the operation of the embodiment of FIG. 1;

FIG. 4 is a schematic illustration of an alternate inverter arrangement similar to that shown in FIG. 1; and FIG. 5 is a sectional illustration of one turn of a choke element utilized in the schematic illustration of FIG. 4.

DESCRIPTION OF THE PREFERRED EMBODIMENT

Referring to FIG. 1 there is illustrated schematically a typical inverter bridge power stage 10 including power switches Q1, Q2, Q3 and Q4, a DC voltage source $V_{DC}$, and a power switch conduction control circuit 20 for generating power switch gating signals B and $\bar{B}$. The inverter circuit output voltage, $E_{out}$, appearing across the inverter output transformer T is developed by the controlled alternate conduction of the power switch pairs Q1 and Q4, and Q2 and Q3. The resulting pulse-width-modulated pulse pattern is filtered by the choke L1 and the capacitor C1 to produce an harmonically neutralized output waveform, typically a sine wave. While the power stage illustrated utilizes an output transformer, the invention is equally applicable to inverter circuits not using output transformers.

The control circuit 20 operates to minimize distortion of the inverter output voltage $E_{out}$ by controlling the conduction of the inverter power switches Q1 through Q4 as a function of the divergence of the inverter output voltage from a reference voltage of controlled magnitude and frequency. The control circuit 20 in essence imparts a random gating of the inverter switch pairs through a drive circuit 50 in response to a preset variance of the magnitude of the inverter output voltage waveform from the reference voltage waveform and in so doing essentially forces the inverter output to duplicate the reference voltage waveform. The frequency of the AC reference corresponds to the desired inverter output frequency.

The control circuit 20 includes a comparator circuit CC having a positive input terminal PT, a negative input terminal NT, a positive feedback circuit 40 and an output terminal OT. The filtered inverter output voltage $E_{out}$, the AC reference voltage $E_{ref}$ produced by AC voltage source 30, and a feedback signal from the feedback circuit 40 are combined and applied to the comparator circuit input terminal PT through an input resistor network comprised of resistor R1, R2, R3 and R5. The comparator circuit CC operation is illustrated by the waveforms of FIGS. 2 and 3. Inverter output waveform $E_{out}$ is illustrated as an AC waveform containing distortion and transients whereas the AC reference waveform $E_{ref}$ is illustrated as an AC waveform exhibiting essentially zero distortion and free of a DC component. The variation of the inverter output voltage $E_{out}$ beyond preset limits $+L$ and $-L$ relative to the AC reference voltage, as illustrated in waveform 3A, results in the generation of comparator circuit plus and minus output voltage signals as illustrated in waveform 3B, which corresponds to points P1, P2, P3, P4, . . . of waveform 3A. The comparator circuit output voltage signals, in the form of drive signals B and $\bar{B}$ from the drive circuit 50, control the gating of the inverter power switches Q1 through Q4 to maintain the inverter output voltage $E_{out}$ within the limits $+L$ and $-L$. The application of the B and $\bar{B}$ drive signals by the drive circuit 50 for gating the power switches Q1 to Q4 may be typically accomplished according to the teachings of U.S. Pat. No. 3,412,316 issued to the inventor on Nov. 19, 1968 and assigned to the assignee of the present invention.

The feedback circuit 40, which comprises capacitor C2 and a divider network including resistors R4 and R5, functions to apply a portion of the comparator circuit output signal to the positive input terminal Pt.

The limits $+L$ and $-L$ are established by the resistors R4 and R5 of the feedback circuit 40. An inherent hysteresis, or error band region, is defined by the limits $+L$ and $-L$ relative to the AC reference voltage $E_{ref}$. This hysteresis provides a finite time interval, $\Delta t$, between the successive switching instants P1, P2, P3, P4 . . . of the power switches Q1 to Q4 by the B drive outputs as illustrated in FIG. 3. For a proper selection of the components of the feedback circuit 40, the value of the limits $+L$ and $-L$ and consequently the finite time interval $\Delta t$, can be altered so as to equal or exceed the storage time of the power switches and thus enable the gating pulses applied to the inverter power switches to drive the power switches into saturation thereby minimizing the forward drop loss of the power switches and preventing loss or "feathering" of a power switch gate pulse. When the finite time interval $\Delta t$ is greater than the power switch storage time there is no significant inverter output waveform distortion produced by nominal gate pulse transport lag.

The capacitor C2 of the feedback circuit 40 effectively isolates the input terminal PT from any average DC voltage which may be present at the output terminal OT of the comparator circuit CC.

The operation of the control circuit 20 in generating the drive signals B and $\bar{B}$ is the same regardless of the polarity of the inverter output $E_{out}$. There is no requirement for logic flip-flop generally included in inverter circuits to account for changes in the inverter output polarity.

The output of the comparator circuit CC changes between B and $\bar{B}$ as the net difference between the inverter output $E_{out}$ and the AC reference $E_{ref}$ exceeds the value of the appropriate limit, either $+L$ or $-L$, established by the resistors R4 and R5.

The comparator circuit CC produces a positive output signal where a net positive signal exists at the positive input terminal PT as a result of the combination of a signal proportional to the inverter output voltage $E_{out}$, a signal proportional to the AC reference voltage $E_{ref}$ and a signal proportional to the preset limit −L which is established by the feedback circuit 40. An output signal is manifested by the B drive signal from the logic NAND-gate LG which, through the operation of drive circuit 50, gates power switches Q1 and Q4 into a state of conduction in order to return the inverter output voltage $E_{out}$ within the preset limits +L and −L. Conversely, the comparator circuit CC output signal becomes negative when a net negative signal exists at the comparator circuit input terminal PT as a result of the combination of the signal proportional to the inverter output voltage $E_{out}$, a signal proportional to the AC reference voltage $E_{ref}$ and a signal proportional to the preset limit +L which is established by the feedback circuit 40. This comparator circuit output signal is manifested by a $\bar{B}$ drive signal from the comparator circuit CC. The $\bar{B}$ drive signal functions to gate the power switches Q2 and Q3 to a state of conduction to reverse the positive trend of the inverter output voltage $E_{out}$ and return the output voltage within the preset limits +L and −L. In the case of a B drive signal that provides compensation for an inverter output voltage $E_{out}$ which exceeds the limit +L, the feedback circuit 40 functions to maintain the corrective effect of the positive B drive signal until the inverter output voltage $E_{out}$ reaches the negative limit −L. Conversely in the event of a $\bar{B}$ drive signal from a comparator circuit CC, the feedback circuit functions to maintain the corrective effect of the $\bar{B}$ drive signal until the inverter output voltage $E_{out}$ reaches the +L limit.

The relationship of the B and $\bar{B}$ power switch drive signals and the voltage waveforms $E_{ref}$ and $E_{out}$ is illustrated in FIG. 2. It is apparent from FIG. 2 that the B drive signal is capable of effecting a high rate of change in the inverter output voltage $E_{out}$ as the difference $\Delta V1$ between the $\bar{B}$ drive signal and the waveform $E_{out}$ becomes small and the difference $\Delta V2$ becomes large. Conversely the $\bar{B}$ drive is capable of effecting the much high rate of change in the inverter output voltage as $\Delta V1$ becomes large.

Capacitor C3 in conjunction with the comparator circuit input resistors R1 and R2 functions as a differentiator and thereby enhances the sensitivity of the comparator circuit CC to the rate of change of the inverter output voltage $E_{out}$. Furthermore capacitor C3 gives the proper anticipatory signal which provides cognizance in the feedback circuit of the nonlinearity of the drive signal B and $\bar{B}$.

The magnitudes of B and $\bar{B}$ drive signals are proportional to the input voltage from the DC voltage source $V_{DC}$ and are therefore susceptible to input voltage ripple. As noted above however the capacitor C3 compensates for nonlinearity in the drive signals B and $\bar{B}$.

Inasmuch as the amplitude of the inverter output voltage $E_{out}$ is strictly proportional to the reference voltage $E_{ref}$, any modulation of input voltage is not transferred to the inverter output voltage $E_{out}$ providing the B and $\bar{B}$ drive levels are maintained greater than the peak values of the desired inverter output waveform $E_{ref}$, thus insuring that neither 66 V1 nor $\Delta V2$ becomes zero.

The control circuit 20 responds to variation in inverter output voltage $E_{out}$ resulting from transformer regulation, output filter regulation, input voltage modulation, etc., by modifying the pulse widths of the pulses generated by the inverter power switches Q1, Q2, Q3 and Q4 to force the inverter output waveform $E_{out}$ to approximate the reference voltage waveform $E_{ref}$. The inverter power circuit will be forced to duplicate the reference voltage $E_{ref}$ which is usually sinusoidal but can be other with a degree of accuracy which can be controlled by the amount of feedback to terminal PT, the inverter design, and the selection of R1, R2 and C3.

The transient response provided by the control circuit 20 is superior to state of the art schemes in that it immediately compensates the inverter pulse widths to correct optimally for transformer and/or output filter regulation as well as for changes in the input voltage from source $V_{DC}$.

This concept of controlling pulse width modulated inverters can be extended to three phase arrangements merely by employing redundant control circuits for each phase and utilizing a three phase reference voltage source. This will result in a three phase inverter which provides individual phase voltage regulation and phase displacement control that is not affected by unbalanced phase loads.

In FIG. 4 there is illustrated an alternate inverter power stage 40, generally described as a center tap power stage. Since the polarity reversals between B and $\bar{B}$ are made at a relatively high frequency, and the current is relatively large, the coupling between the two branches of the center tap power stage is critical. A special type of Andre choke L2 is used, which is wound with bifilar Litzendraht wire that achieves very close capacitive coupling with distributed capacitance through the choke windings. The combination of the high-frequency Andre choke and the utilization of capacitors C3A and C3B across the inputs of the center tap power circuit permits high-frequency switching of the power switches Q5 and Q6 without output distortion.

FIG. 5 shows the cross section of an Andre choke consisting of the stranding of two colors of magnetic wire represented as strands S1 and S2, respectively. The strands are separated by color to obtain the two windings required by the Andre choke.

The use of the round bifilar wire in place of the flat foil commonly used, the capacitance between the two coils of the Andre choke exhibits a lesser amount of capacitance due to the limited contacting surfaces of the adjacent coils. This reduces substantially the capacitance at the terminals of the choke which could destroy the power switching devices due to the large surge current that would be produced when the power switching device is activated.

The chokes used in either power circuit 10 or power circuit 40 are if a "swinging" type in which the inductance is reduced by the fundamental-frequency of the output current. The "-swinging" choke improves efficiently at light loads and minimizes losses in the running standby condition.

We claim:

1. In a power inverter apparatus for converting DC input voltage into an inverter apparatus AC output voltage, the combination of,
    a power stage including switching devices operatively connected for producing the output of said apparatus,
    a drive circuit means, said drive circuit means responding to activating signals by switching said power switching devices to produce said apparatus AC output voltage,
    an AC voltage source for producing an AC reference voltage of a predetermined magnitude and frequency, and
    a control circuit means having a first input and a second input and an output operatively connected to said drive circuit means,
    said AC reference voltage being supplied to said first input and said apparatus AC output voltage being supplied to said second input,
    said control circuit means including means for establishing positive and negative limits about said AC reference voltage,
    said control circuit means responding to variations of said apparatus AC output voltage beyond said positive and negative limits relative to said AC reference voltage to produce drive circuit means activating signals, and an anticipatory circuit means operatively coupled between the apparatus output and said control circuit means to increase the sensitivity of said control circuit means to the rate of change of the apparatus AC output voltage,
    said drive circuit means responding to said activating signals by switching said power switching device in such a manner as to maintain said AC output voltage within said positive and negative limits.

2. In power inverter apparatus for converting DC input voltage into an inverter apparatus AC output voltage, the combination of:
    a power stage including switching devices operatively connected for producing the output of said apparatus,
    a drive circuit means, said drive circuit means responding to activating signals by switching said power switching devices to produce said apparatus AC output voltage, an AC reference voltage source for producing an AC reference voltage of a predetermined magnitude and frequency, and a control circuit means having a first input and a second input, and an output operatively connected to said drive circuit means, said AC reference voltage being supplied to said first input and said apparatus AC output voltage being supplied to said second input, said control means producing drive circuit means activating signals in response to a divergence of said apparatus AC output voltage beyond predetermined positive and negative limits relative to said AC reference voltage, wherein said control circuit means includes a comparator circuit means having an input circuit and an output, said AC reference voltage and said apparatus AC output voltage being supplied to said input circuit, said comparator circuit means producing an output signal in response to a divergence of the magnitude of said apparatus AC output voltage from said AC reference voltage, and a feedback circuit coupled between the output of said comparator circuit and the input circuit for supplying a portion of the comparator circuit output signal to the input circuit, the amounts of output signal supplied by the feedback circuit to the input circuit functioning to determine the positive and negative limits relative to said AC reference voltage, and essentially establishing a deadband about the AC reference voltage within which the apparatus AC output voltage may vary without initiating a comparator output signal, said drive circuit means responding to said activating signals by switching said power switching devices in such a manner as to maintain said AC output voltage within said predetermined positive and negative limits.

3. In the combination of claim 2 wherein said control circuit includes a logic circuit means operatively coupling such comparator circuit output and said drive circuit means, said logic circuit means sensing the polarity of the divergence and producing drive circuit means activating signals which compensate for said divergence by switching the power switching device in such a manner as to return the apparatus AC output voltage within said predetermined limits, the operation of said logic circuit means being the same regardless of the polarity of the apparatus AC output voltage.

4. In the combination of claim 2 wherein said input circuit includes a differentiator circuit operatively connected between the apparatus output and said comparator circuit, said differentiator circuit functioning to increase the sensitivity of the comparator circuit to the rate of change of the apparatus AC output voltage.

5. In the combination of claim 2 wherein said AC reference voltage source produces a sinusoidal reference voltage corresponding in amplitude and frequency to the desired apparatus AC output voltage, said sinusoidal reference voltage being substantially void of DC components.

6. In the combination of claim 2 wherein said feedback circuit includes circuit means for effectively blocking any average DC voltage present in the comparator circuit output signal.

7. In the combination of claim 2 wherein the predetermined limits established by the feedback circuit provide a finite time interval between the switching of said power switching devices.

8. In the combination of claim 7 wherein said finite time is sufficient to permit operating said power switching devices in a saturated switching mode.

9. In the combination of claim 2 including a power transformer having a primary winding connected to the apparatus output and developing said apparatus AC output voltage across a secondary winding, and a choke of the type in which inductance is reduced by the fundamental-frequency apparatus output current connected in series with said primary winding.

10. In the combination of claim 1 wherein said power stage comprises, a DC voltage source having a first and second terminal, a center tap power stage including a first and second power switching device, a transformer including an input winding, having a center tap connection, and an output winding, said center tap connection being operatively connected to said first terminal of said DC voltage source, an Andre choke having a first and second winding, said first winding coupling said first power switching device between said second terminal said DC voltage source and one end of said input winding, said second winding coupling said second power switching device between said second terminal of said DC voltage source and the other end of said input winding, and capacitance filter means operatively connected between the center tap and the ends of said input winding.

11. In the combination of claim 10 wherein said Andre choke is a high-frequency choke which is wound with bifilar Litzendraht wire.